United States Patent [19]

Mori

[11] 4,400,777

[45] Aug. 23, 1983

[54] INFORMATION PROCESSING SYSTEM FOR A COMPUTER OUTPUT MICROFILMER

[75] Inventor: Sumio Mori, Asaka, Japan

[73] Assignee: Fuji Photo Film Co., Ltd., Kanagawa, Japan

[21] Appl. No.: 269,960

[22] Filed: Jun. 3, 1981

Related U.S. Application Data

[63] Continuation of Ser. No. 940,307, Sep. 6, 1978, abandoned.

[51] Int. Cl.³ .............. G06F 15/16; G06F 15/20; G06F 3/153; G06F 3/08
[52] U.S. Cl. .................................................. 364/200
[58] Field of Search ... 364/200 MS File, 900 MS File; 354/7; 346/76 L

[56] References Cited

U.S. PATENT DOCUMENTS

| | | | |
|---|---|---|---|
| 3,036,291 | 5/1962 | Whittle et al. | 364/900 |
| 3,286,083 | 11/1966 | Nielsen | 364/900 |
| 3,465,352 | 9/1969 | Carlson et al. | 346/76 L |
| 3,484,751 | 12/1969 | Cameron et al. | 364/900 |
| 3,689,894 | 9/1972 | Laura et al. | 364/900 |
| 3,701,999 | 10/1972 | Congleton et al. | 346/76 L |
| 3,772,657 | 11/1973 | Marsalka | 364/200 |
| 3,801,201 | 4/1974 | Greenblatt | 354/7 X |
| 4,012,132 | 3/1977 | Lazarus | 364/900 X |

*Primary Examiner*—Harvey E. Springborn
*Attorney, Agent, or Firm*—Gerald J. Ferguson, Jr.; Joseph J. Baker

[57] ABSTRACT

An information processing system is used in a computer output microfilmer in which sub-information such as titles and indices is recorded on a recording medium such as a microfilm together with pre-processed main information obtained from a computer. The pre-processed main information is processed through a main information processing unit. The sub-information is prepared and processed through a sub-information processing unit in which key words contained in the main information are detected and the sub-information is prepared based on the key words. The output of the main information processing unit and the output of the sub-information processing unit are combined and recorded on the recording medium by means of a recorder.

4 Claims, 3 Drawing Figures

INFORMATION PROCESSING SYSTEM FOR A COMPUTER OUTPUT MICROFILMER

This is a continuation of application Ser. No. 940,307, filed 9/6/78 which is now abandoned.

BACKGROUND OF THE INVENTION

1. Field of the Invention

This invention relates to an information processing system adapted to be used for a computer output microfilmer (COM) which records a computer output on a recording medium such as a microfilm, and more particularly to an information processing system for a COM device in which two kinds of information processing devices are used for simultaneously processing main information and sub-information in parallel.

2. Description of the Prior Art

Recently, a computer output microfilmer (hereinafter referred to as "COM device") has been developed and used as a new output device for an electronic computer. The COM device reads out the output data of a computer, processes the data and records the processed output data directly on a microfilm. The COM device is advantageous for its high speed in recording information.

In the COM device, it is necessary that not only the main information but also the sub-information such as titles or indices should be recorded so that the main information may be recorded together with such sub-information.

In the conventional COM devices, there have been two methods for recording the sub-information together with the main information. In one of them, the sub-information is prepared by a separate computer and is stored in a magnetic tape or the like outside the COM device so that the sub-information is recorded on a microfilm together with the main information by the COM device. In this case, the separate computer is over-loaded and the throughput time becomes long. Further, in this case, the operation of the COM device and the computer is complicated. In the other method, a mini-computer is incorporated in the COM device for automatically preparing the sub-information in the COM device based on the key words obtained from the main information read out from a magnetic tape or the like, thereby recording the sub-information together with the main information. This method is widely used in the so-called intelligent COM devices which are widely available in the recent market. In this method, however, the main information and the sub-information are processed in series, and accordingly, the processing speed is low and the throughput time is long. If a high speed processing device is incorporated to increase the speed, the cost of the COM device is increased. A prior art system wherein a mini-computer is employed is a 3800 COM System Overview manufactured by the Bell & Howell Co., U.S.A. It is desirable in a COM device that the information be processed and recorded at a high rate of speed. In particular, in a COM device of the type which produces sub-information based on the main information inputted thereinto, the information processing should occur at a high rate of speed. The present invention makes an improvement in this type of COM device.

For high speed processing, a high speed mini-computer (e.g. PDP/8 or PDP/11 produced by Digital Equipment Corporation in the U.S.A., or MCR 605) is incorporated in the conventional COM device. However, since a high speed mini-computer such as the PDP/11 is very expensive, the price of a COM device containing such a mini-computer is very high.

On the other hand, micro-computers have been used in other fields such as the 8080 micro-computer produced by INTEL in the U.S.A. or Z/80 micro-computer produced by Zilog in the U.S.A., these micro-computers being much less expensive than a mini-computer. The 8080 or Z/80 micro-computers including interfaces therefor are approximately ten times less expensive than the above-mentioned PDP/11 mini-computers. If a micro-computer could be used as an information processing device for a COM device, the cost of the COM device would be substantially reduced. However, the data processing speed of a micro-computer is very low. The data processing speed of a micro-computer is generally $\frac{1}{4}$ to $\frac{1}{8}$ that of a 16 bit parallel processing type mini-computer. Accordingly, a micro-computer has not been used in conventional COM devices.

In view of the foregoing, this invention has an object to provide a COM device equipped with micro-computers having a short throughput time. The term "short throughput time" means that the throughput time of the COM device with micro-computers according to this invention is the same as or shorter than the throughput time of a conventional COM device with a mini-computer.

The assignee of this application has manufactured a commercially available COM device using the information processing system including micro-computers according to this invention. The inventor conducted a performance test of this COM device, and as a result, found that the recording speed of this COM device was higher than a conventional COM device (that is, the aforementioned 3800 COM system).

SUMMARY OF THE INVENTION

In view of the above-mentioned defects in the conventional COM devices, the primary object of the present invention is to provide a COM device having a short throughput time.

A more specific object of the present invention is to provide an information processing system for a COM device which enables the COM device to have a short throughput time even when a slow information processing device such as a micro-computer is incorporated in the COM device.

Another object of the present invention is to provide an information processing system for a COM device which is inexpensive and has a short throughput time.

In accordance with the present invention, there is provided an information processing system for a COM device in which sub-information is recorded together with the main information. The information processing system in accordance with the present invention comprises an input device, a main information processing unit, a sub-information processing unit, and an output device for the main and sub-information, the main information processing unit (a) processing the main information read out from the input device (b), transferring the processed main information to the output device and controlling the recording of the main information on a recording medium, detecting key words of titles or indices and particular commands from the main information read out from the input device, and (c) transferring the detected key words and commands to the sub-information processing unit, the sub-information processing unit preparing sub-information based on the key words when the same has received the key words from the main information processing unit and transferring the prepared sub-information to said output device when the same has received the particular commands, whereby (a) the sub-information processing means processes the sub-information at the same time the main information processing unit is processing the main information and controlling the recording of information and (b) the main information processing unit controls the recording of the sub-information after the main information has been processed.

DESCRIPTION OF THE PREFERRED EMBODIMENT

Figure 1:
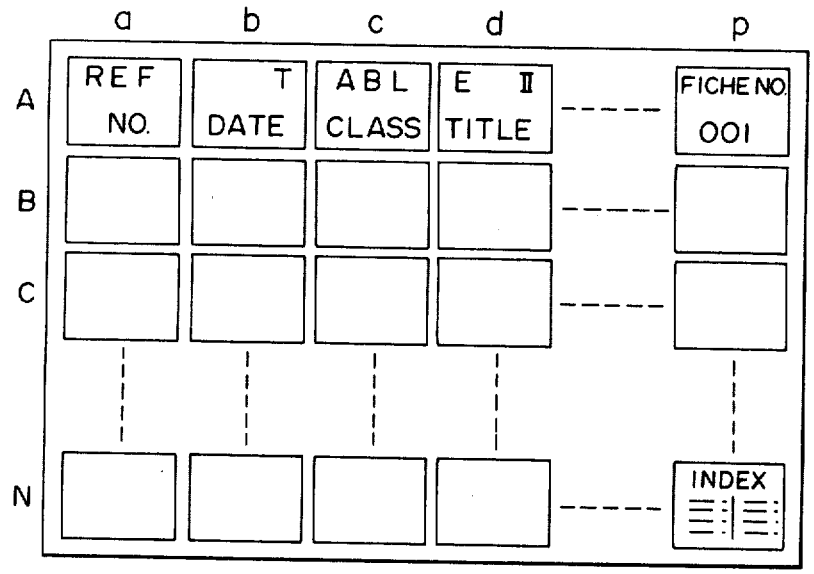
FIG. 1 is a plan view showing an example of a microfiche prepared by the COM device provided with the information processing system in accordance with the present invention.
Figure 2:
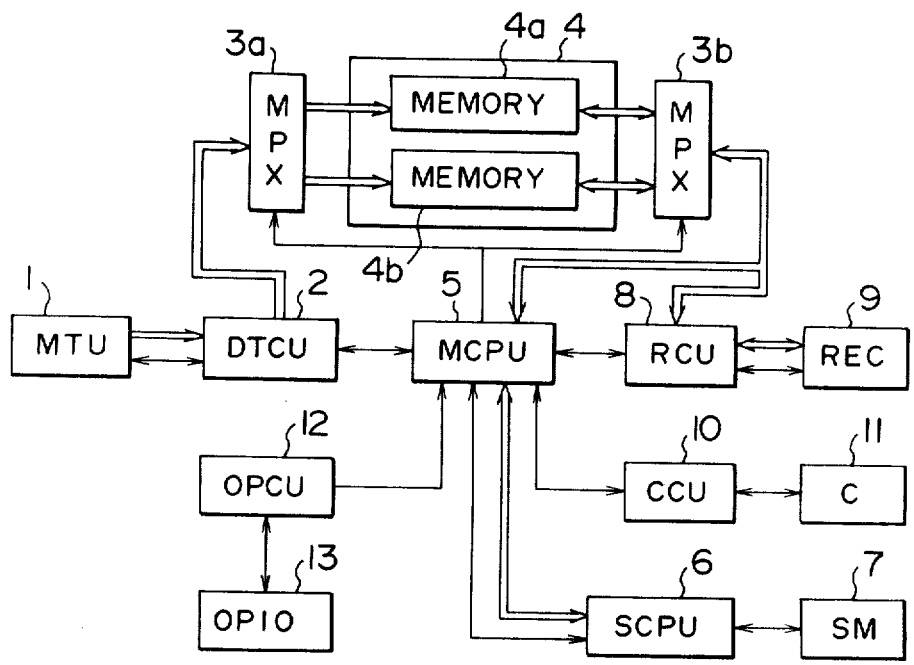
FIG. 2 is a block diagram showing an embodiment of the information processing system in accordance with the present invention.

The information processing system in accordance with an embodiment of the present invention as shown in FIG. 2 is used for preparing a microfiche as shown in FIG. 1 for instance.

Referring to FIG. 1, the microfiche is recorded with both the main information substantially representing the output of a computer and sub-information which means the fixed information such as a title of the information and the various indices to be recorded on the microfiche together with the main information. The microfiche as shown in FIG. 1 comprises 14 rows, A to N, and 16 columns, a to p, namely 224 frames. In the first row A (title frames) and the index frame (N-th row, p-th column), the sub-information is recorded, and in the second to the last rows (B to N) except the last index frame (data frames) the main information is recorded. In the title frames, there are recorded fixed titles such as "Ref. No.", "date" etc. and variable titles such as "Table II". In the index frame are generally recorded index key words and the frame numbers of the data frames carrying the key words.

The microfiche as shown in FIG. 1 is recorded by use of the information processing system in accordance with one embodiment of the present invention as shown in FIG. 2. Referring to FIG. 2, in which the directions of flow of the main and sub-information are indicated by double arrows and the directions of the flow of control are indicated by single arrows. A magnetic tape unit (hereinafter referred to as "MTU") 1 is provided as an input means for storing the main information data processed by a separate computer. The output of the input means MTU 1 is connected with a data transfer control unit (DTCU) 2 for reading out the data from the MTU 1, checking the same and transferring the same to a buffer memory 4 by way of a multiplexor channel (MPX). The multiplexor channel is used for making a change-over between data bus and address bus and consists of two multiplexors 3a and 3b. A main information central processor unit (MCPU) 5 is connected with the buffer memory 4 by way of the multiplexor channel 3b for processing the data from MTU 1 memorized by the buffer memory 4. A sub-information central processor unit (SCPU) 6 is connected with the MCPU 5 for preparing the titles and indices to be recorded on the microfiche based on the data (key words of the titles and indices) from the MCPU 5. A separate memory device (SM) 7 is connected with the SCPU 6 for memorizing the sub-information such as titles, patterns for forming titles, indices etc. in a magnetic drum, a magnetic disc or the like.

In operation of the above described system, MCPU 5 first operates to make the data bus of one MPX 3a set at the first memory group 4a of the buffer memory 4 and the address bus of the other MPX 3b at the second memory group 4b of the buffer memory 4, and gives a command for data read-out to DTCU 2. Then, DTCU 2 starts to control MTU 1 and reads out data for conducting necessary data check and data format processing, and transfers data to the memory group 4a by way of a direct memory access controller (DMA) and gives a completion signal to MCPU 5 when a designated data block number of data have been completed of its transfer. Thereafter, MCPU 5 makes the MPX 3a set at the memory group 4b and MPX 3b set at the memory group 4a, and simultaneously gives a command for data read-out to DTCU 2 for making DTCU 2 read out data from MTU 1 and transfer the read out data to the memory group 4b to start processing of the data stored in the memory group 4b. The data in the memory group 4a processed are transferred to the recorder control unit (RCU) 8 by way of MPX 3b. When the processing of the data in the memory group 4a has been completed through MCPU 5 and the transfer of the data to the memory group 4b has been completed by DTCU 2, MCPU 5 again makes MPX 3a set at the memory group 4a and MPX 3b set at the memory group 4b and conducts read-out and processing as mentioned above in the same sequence. The above described setting of the data bus and the address bus can readily be conducted by using a commercially available multiplexor IC such as "IC8263" or "IC8267" made by Intel Corporation. The foregoing setting of the data bus and the address bus can also be effected with multiplexors manufactured by Texas Instruments Corp. In particular, for multiplexor 3a, the Texas Instrument circuit SN 74139 can be employed while for multiplexor 3b, Texas Instrument SN 74157 can be employed. Both of these circuits have been publicly used in the United States since 1970. Further, the multiplexors 3a and 3b perform the same functions as those of the coupling units 206 and 207 shown in FIG. 2 of U.S. Pat. No. 3,772,657. The combination of the multiplexor channel and buffer memory 4 of the subject application corresponds to the combination of the coupling unit 206 and 208 and the intermediate memory units 204A and B in U.S. Pat. No. 3,772,657.

Now the sequence of the data processing of the memory groups 4a and 4b will be described. The program in MCPU 5 is capable of taking out one record of the data in the memory group 4a and accessing thereto, and further capable of conducting a necessary processing thereof such as control code action, format processing for recording with the recorder 9, detection of indices or title key words, data check and so forth. The control code action means a row feed control in a frame in the microfiche, a frame feed control, a microfiche feed control etc. The format processing means, for instance, editing print format of the data to be recorded on the microfiche, negative-positive conversion, and check of the data content. The detection of indices or title key words means the detection of key words necessary for preparing the index list or title patterns for the title frames, which are to be transferred to SCPU 6. By the above mentioned processing, the necessary data are transferred to RCU 8 and sent to the recorder 9 as a video signal by way of a character generator and a video shift register. A typical character generator and video shift register which may be used in the present invention is the MCM 6570-79 described at pages 5–122 and 5–123 of "The Complete Motorola Microcomputer Data Library" of Motorola Semiconductor Products Inc. The MCM 6570-79 has been publicly used in the United States since May 1973. The data are converted to an optical pattern of characters in the record. The pattern is recorded on the microfiche by way of an optical system in a camera 11. The recorder may be a CRT type character display device or an output device as described hereinafter. When MCPU 5 necessitates operation of a camera 11 for frame feeding or microfiche feeding during the data processing operation, MCPU 5 sends a command for such operations to a camera control unit (CCU) 10 so that CCU 10 controls the operation of the camera 11. When MCPU 5 is required to communicate with the operator while processing data, for instance when the whole process is ended, microfiche has run short or wrong information is found, a necessary command is sent to an operation input-output control unit (OPCU) 12, which in turn controls an operation input-output unit (OPIO) 13 such as a key board, printer or display panel to communicate with the operator.

Now the processing of the sub-information will be described. When MCPU has detected an index key word or title key word in a process of one unit of information to be recorded, a command necessary for preparing an index list or a title pattern corresponding to the key word such as a frame number of the microfiche, number of digits of the key word, designation of title or index, size of the character pattern or the like is transferred to SCPU 6. The SCPU 6 conducts formation of the title patterns as shown in the frames in the first row of FIG. 1 or formation of an index list to be recorded in the index frame according to the key word and the command. For instance, when SCPU 6 reads out the command from MCPU 5 and prepares an index list, renews the index key words and frame numbers at the corresponding position in the format of the index frame memorized in advance by SM 7. When a title pattern is prepared, the format and the character pattern for every title frame is memorized in advance in SM 7, and the corresponding character pattern is read out according to the title key word, the character pattern is enlarged into the designated size and renewed at the corresponding position in SM 7. While SCPU 6 is conducting the above mentioned process, MCPU 5 directly or indirectly access to the memory group 4a or 4b and processes the record, and the processed record is recorded on the microfiche in the camera by way of RCU 8 and the recorder 9. When MCPU 5 has detected the completion of the recordal of the record for one microfiche, MCPU 5 gives a particular command to SCPU 6. SCPU 6 reads out sub-information such as an index list or title pattern for every title frame according to the command, and successively transfers one unit of record or information one by one to MCPU 5. The transferred record is further transferred from MCPU 5 to the microfiche by way of RCU 8 and recorder 9. The record of the read out sub-information from SM 7 can be transferred directly to RCU 8 without by way of MCPU 5.

As the title for the sub-information, fixed information like "REF No.", "DATE", "CLASS" and "TITLE" as shown in FIG. 1 and variable information like "TABLE II" are recorded. Among these kinds of information, the fixed information is prepared in advance in SM 7. It is most probable that the key word of the index appears once for every data frame of the microfiche and the key word of the variable title appears in the first data frame of one microfiche. Therefore, the preparation or renewal of the index list may be processed in the period of one frame processing (e.g. about 300 ms) of the data frame and the camera, and the preparation of the variable title pattern for each title frame may be processed in the period of recording one microfiche (e.g. about 50 seconds). Therefore, the above process can be carried out by a substantially slow information processing machine such as a micro computer.

Figure 3:
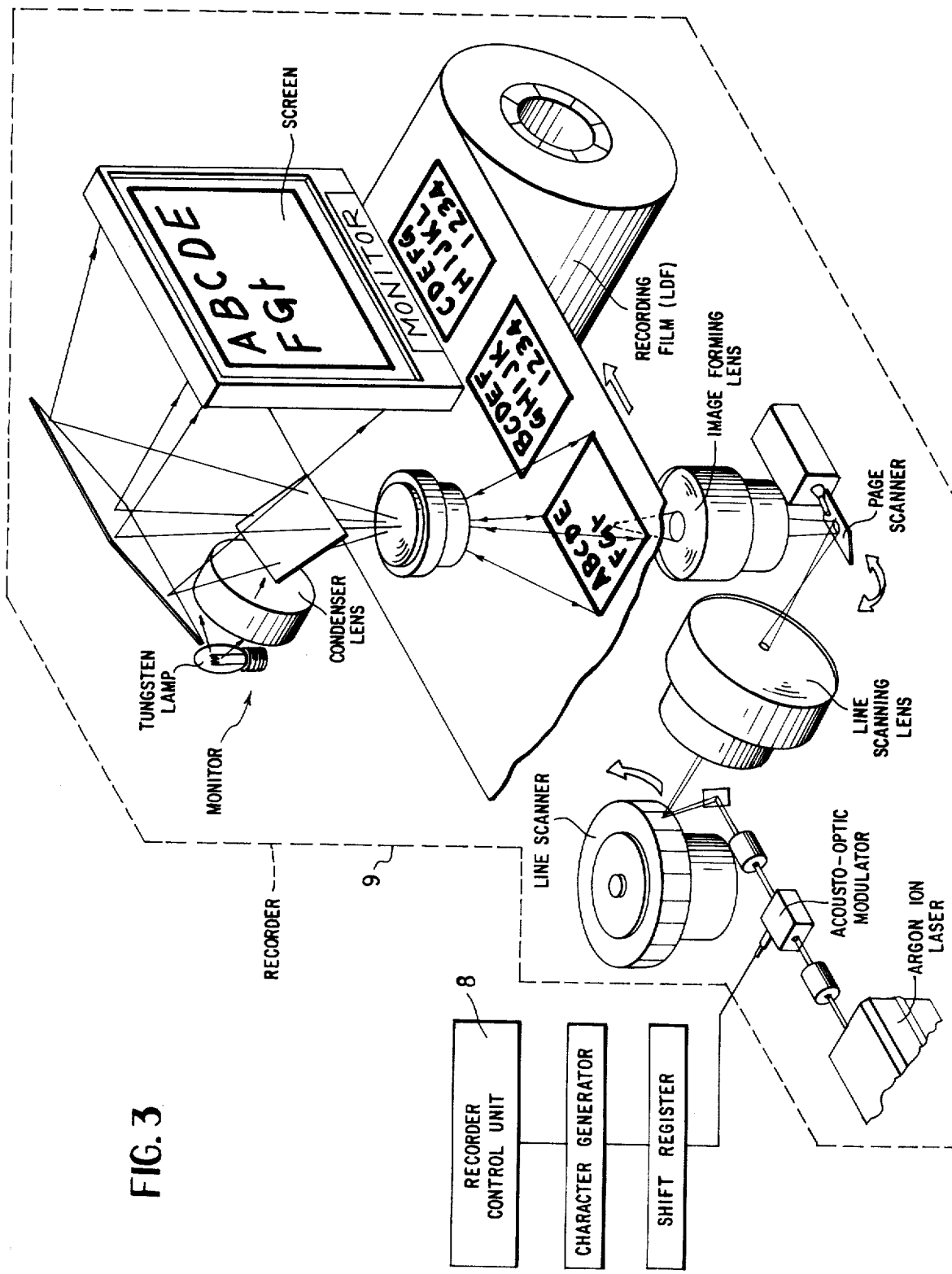
FIG. 3 is a diagrammatic illustration of a portion of the information processing system of the present invention illustrating a laser beam scanning device for recording information on a recording medium.

In the above described embodiment, only one example has been described and accordingly various modification thereof is possible. For instance, various transfers in the above process can be carried out by way of DMA (direct memory access controller). The output means may be a laser beam scanning device (see FIG. 3) which records information on a recording medium by scanning the medium by the laser beam, in which the laser beam is modulated by said output means. Further, in this invention the input means and the output means may be properly selected from among the conventional devices. In the present invention, as the main information processing unit and the sub-information processing unit can be used a comparatively slow speed computer like micro computer.

I claim:

1. An information processing system for a computer output microfilmer in which sub-information such as titles and indices is recorded on a recording medium such as a microfilm together with processed main information comprising an input means responsive to a computer which pre-processed said main information, a main information processing means for processing the pre-processed main information to provide said processed main information, a sub-information processing means, and an output means responsive to the main information processing means for recording on said recording medium, said main information processing means including (a) means for processing the pre-processed main information read out from said input means, (b) means for transferring the processed main information to said output means, (c) means for controlling the recording of the processed main information transferred to said output means onto said recording medium, (d) means for detecting key words that are part of said titles or indices and predetermined commands from said pre-processed main information read out from said input means, and (e) means for transferring the detected key words and predetermined commands to said sub-information processing means as input information thereto, said sub-information processing means including (a) means for preparing said sub-information including said titles or indices based on the key words thereof when the same has received said key words from said main information processing means, (b) means for transferring said prepared sub-information to said output means when the sub-information processing means has received said predetermined commands and (c) means for processing the sub-information at the same time said main information processing means is processing the pre-processed main information and controlling the recording of the processed main information and said main information processing means further including means for controlling the recording of the sub-information after the pre-processed main information has been processed.

2. An information processing system according to claim 1 wherein said main information processing means and said sub-information processing means are micro-computers.

3. An information processing system according to claim 1 wherein said output means is a cathode ray tube character display device.

4. An information processing system according to claim 1 wherein said output means is a laser beam scanning recording device.

* * * * *